Patented Dec. 28, 1937

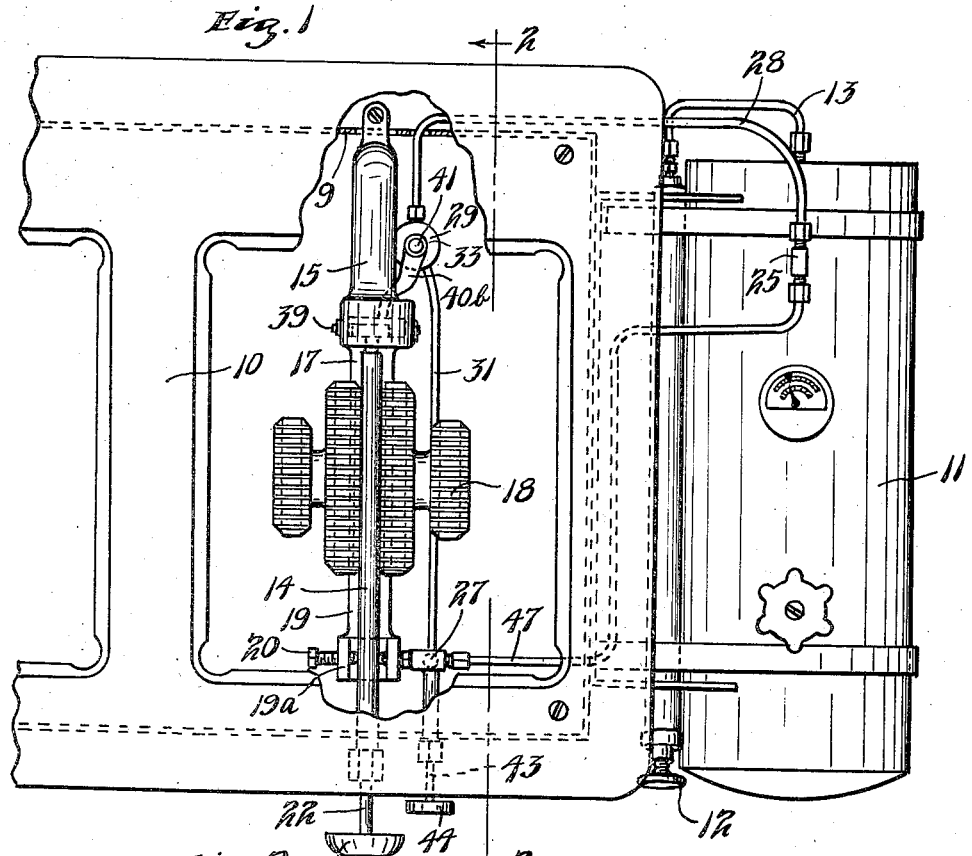

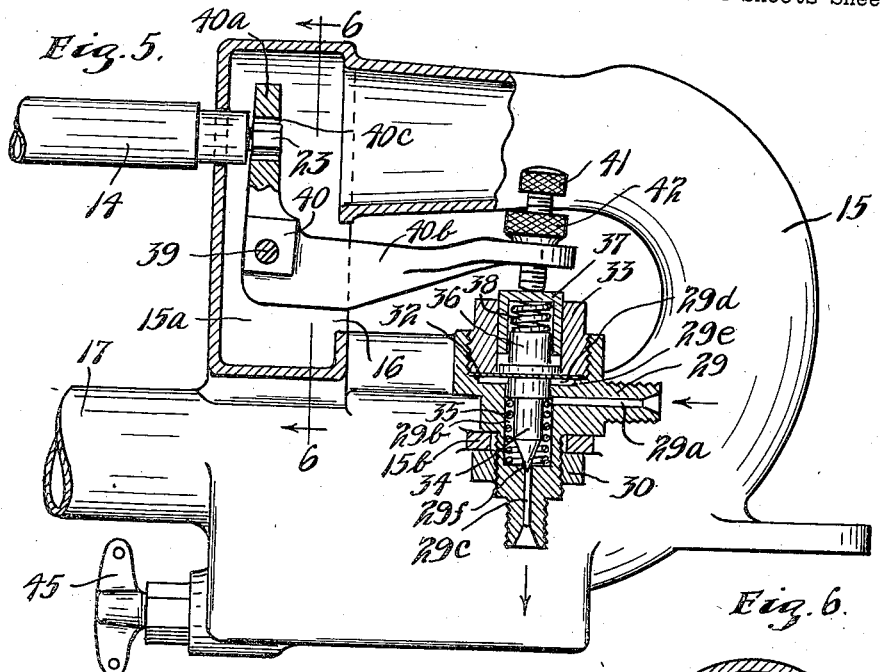
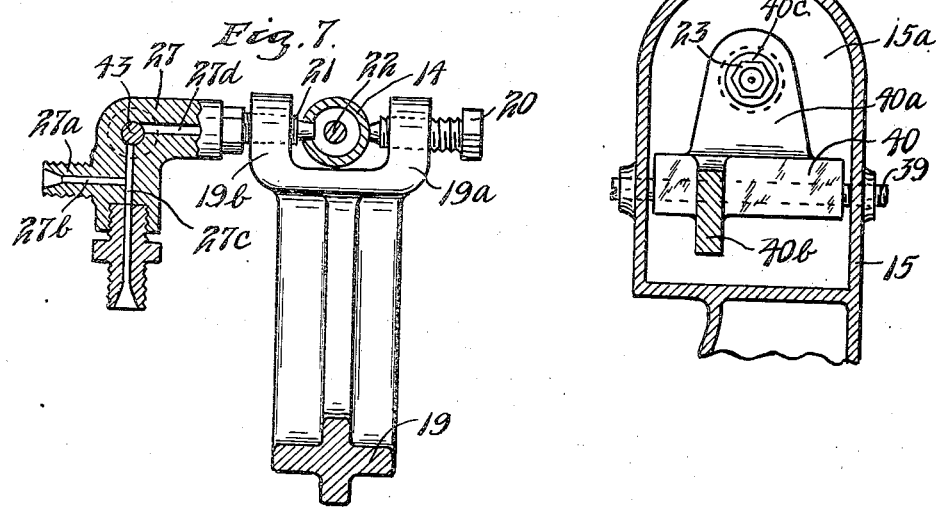
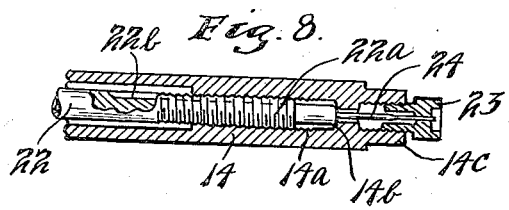

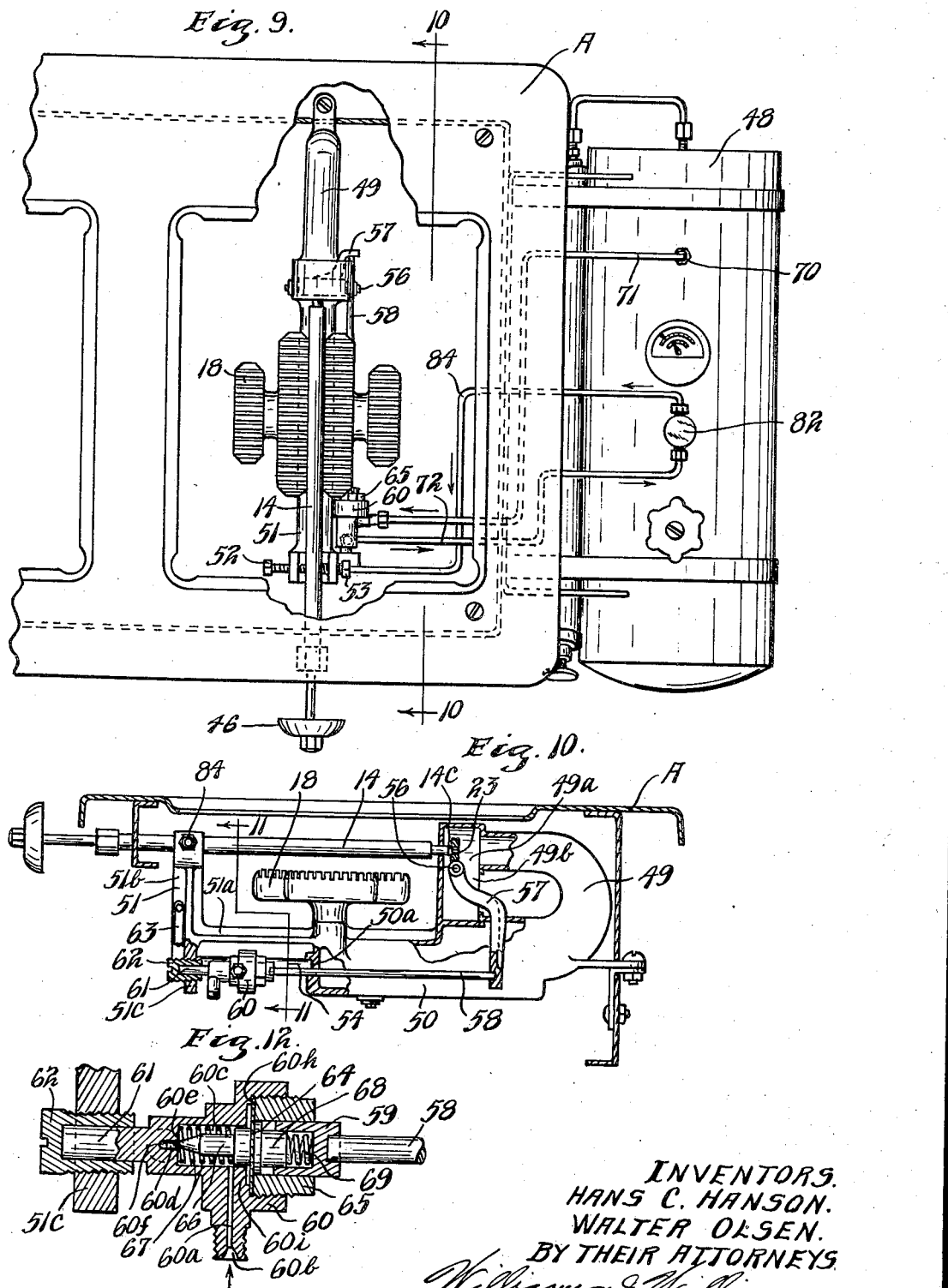

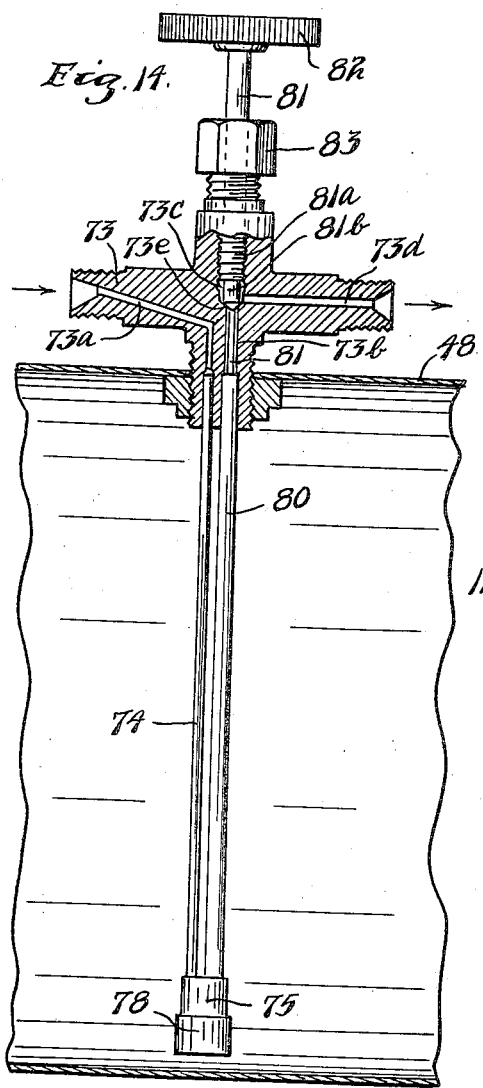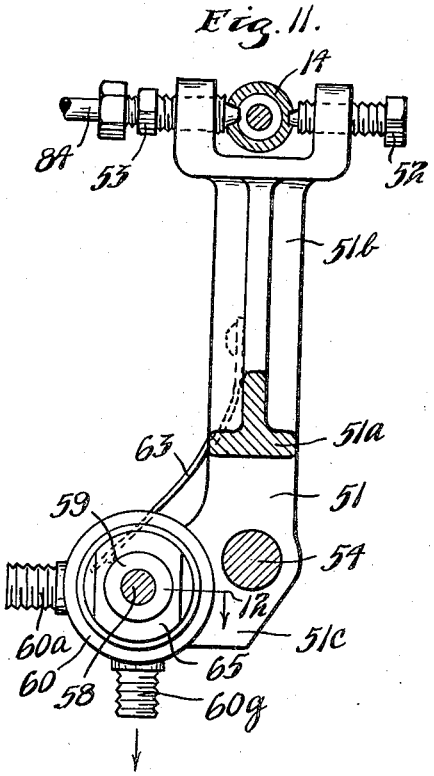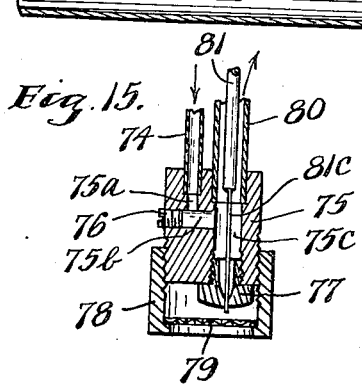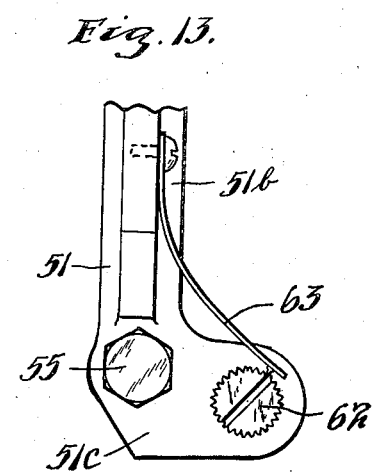

2,103,328

UNITED STATES PATENT OFFICE 2,103,328

FUEL FEEDING SYSTEM WITH THERMOSTATIC AIR CONTROL

Hans C. Hanson and Walter Olsen, Albert Lea, Minn.

Application October 18, 1933, Serial No. 694,082

9 Claims. (Cl. 158—81)

This invention relates to fuel feeding systems for hydrocarbon burners, such as those used in gasoline stoves, lanterns, heaters etc.

In gasoline burning equipment such as a gasoline stove, it has been the common practice to generate the gasoline into gaseous form in a generator tube heated by the burner prior to the time that the generated gas together with whatever air is needed for combustion is supplied to the burner. To initially set the burner in operation when the generator tube is cold, it has been the practice to either heat the generator tube as by a torch or a secondary burner before the valve controlling the supply of fuel from the generator tube to the burner is opened, or it has been the practice to supply compressed air from a fuel tank together with small quantities of gasoline from the fuel tank to the generator tube so as to form an ignitible mixture without prior preheating of the generator tube. When the latter type of fuel feeding system is employed, to prevent the exhaust of compressed air from the fuel tank, it has been necessary to either manually cut off the supply of air to the generator tube after the tube is heated or to operate certain mechanism to permit only the liquid gasoline to be supplied to the generator tube after it has been heated.

It is an object of the present invention to provide a novel and improved fuel feeding system for hydrocarbon burners whereby the burner can be initially lighted without first preheating a generator tube and wherein the control valves or control mechanism for the burner need not be changed after the generator tube has been heated, thus simplifying the starting operation.

More specifically, it is an object of the invention to provide means for automatically cutting off the supply of compressed air to a generator tube after the tube has been heated to such a point that liquid fuel supplied to the tube will be generated into gas to supply the burner.

A further object is to provide means operated thermostatically by the expansion of the generator tube as it is heated to cut off the supply of compressed air thereto, after the burner has been first set in operation and the generator tube has been heated to reach a certain temperature.

Another object is to provide means compensating for the expansion through heat of the parts supporting the generator tube and the thermostatically operated means.

Still another object of the invention is to provide in a burner supplied with liquid fuel by means of compressed air in a liquid fuel tank, means for exhausting the compressed air from the fuel tank to prevent further feed of liquid fuel to the burner in case the burner should fail at any time.

The objects and advantages of the invention will more fully appear from the following description, made in connection with the accompanying drawings, wherein like reference characters refer to the same or similar parts throughout the various views, and, in which, Fig. 1 is a plan view of portions of a stove incorporating therein an embodiment of the novel fuel feeding system of the present invention;

Fig. 2 is a vertical section taken on the line 2—2 of Fig. 1, as indicated by the arrows;

Fig. 3 is a vertical longitudinal section taken through the fuel tank of the embodiment shown in Fig 1;

Fig. 4 is a vertical section in enlarged scale taken through the fitting mounted in this same fuel tank;

Fig. 5 is a view in side elevation illustrating the mixing tube and parts connected thereto of the embodiment shown in Fig. 1, certain of the parts being shown in vertical section;

Fig. 6 is a vertical section taken on the line 6—6 of Fig. 5, as indicated by the arrows;

Fig. 7 is a view taken chiefly in vertical section through the generator tube and the valve body controlling the liquid fuel and air lines running thereto of the embodiment shown in Fig. 1;

Fig. 8 is a vertical longitudinal section through the forward portion of the generator tube;

Fig. 9 is a plan view of portions of a stove incorporating therein a second embodiment of the novel feeding system of the present invention;

Fig. 10 is a vertical section taken on the line 10—10 of Fig. 9, as indicated by the arrows, certain of the parts being broken away to more clearly show the construction thereof;

Fig. 11 is a vertical section taken on the line 11—11 of Fig. 10, as indicated by the arrows;

Fig. 12 is a horizontal section taken on the line 12—12 of Fig. 11, as indicated by the arrows;

Fig. 13 is a view in front elevation illustrating the lower portion of the arm connected to the generator tube in the embodiment illustrated in Figs. 9 to 12;

Fig. 14 is a vertical longitudinal section taken through a portion of the tank shown in Fig. 9; and Fig. 15 is a vertical section taken through the lower ends of the tubes disposed within the tank and shown in Fig. 14.

Referring to the drawings and first to the embodiment of the invention shown in Figs. 1 to 8 thereof, portions of a stove adapted for the burning of vaporized gasoline are illustrated. This stove includes a frame 9, an apertured top plate 10, and a fuel tank 11 attached to the frame and within which gasoline is adapted to be held under air pressure. A pump 12 connected by a conduit 13 to tank 11 may be used for pumping air into the tank 11. Mounted in the front of the frame 9 is a generator tube 14 of the usual type and the discharge end of the tube is reduced slightly to be received within an opening in a mixing tube 15 secured to the back part of the frame 9. This mixing tube is of substantially U-shape, as best shown in Fig. 5, and it is provided with an air inlet opening 16 leading into an upper chamber 15a of the tube. A conduit 17 preferably cast integral with the mixing tube runs forwardly therefrom and a burner 18 is mounted on this conduit to receive therefrom and this burner is located immediately below the generator tube 14, so that the flame from the burner will play onto the generator tube. An arm 19 preferably cast integral with the conduit 17, projects forwardly and then upwardly therefrom to divide into bifurcated portions 19a and 19b respectively, between which the generator tube 14 is received. The bifurcated portion 19a carries a screw 20 which bears against the generator tube, while the bifurcated portion 19b carries a nipple 21 having a truncated conical portion received within an opening in the generator tube 14. It should perhaps be noted that the nipple 21 is connected to the generator tube 14 near the forward side of the stove in forwardly spaced relation from the burner 18 and from the discharge end of the generator tube.

The generator tube 14 is equipped with the usual valve 22 having a handle 46 at the front of the stove and this valve is provided near its rear end with a screw threaded portion 22a engaging an internally screw threaded portion 14a of the generator tube. The valve also is provided with a fuel conducting groove 22b extending through the screw threaded portion 22a thereof. The internal diameter of the generator tube 14 is reduced beyond the rear end of the valve 22 to form a valve seat 14b with which the rear end of the valve is adapted to cooperatively engage. The reduced rear end of the generator tube is provided with an internal screw threaded bore within which an orifice equipped plug 23 is received. A needle 24 mounted in the rear end of the valve 22 extends through the orifice in the plug 23. The head of the plug 23 is of somewhat reduced diameter relative to the extreme end portion of the generator tube 14, so that the rear end of the tube forms a shoulder 14c adjacent the head of the plug 23.

The parts thus far described are of standard construction.

Mounted in the fuel tank 11 is a fitting 25, best illustrated in Figs. 3 and 4. This fitting has a vertical bore 25a extending upwardly from its lower end to communicate with a horizontal bore 25b. A tube 26 running down into the liquid fuel space of the tank 11 is mounted in the lower part of the bore 24a for the purpose of delivering gasoline from adjacent the bottom of the tank to the bore 25a and thence through the bore 25b into a pipe 41 connected to the fitting. This pipe 41 forms the gasoline supply line of the stove and it is connected at its end remote from the tank to a screw threaded nipple 27a formed in a valve body 27 connected to the nipple 21. The fitting 25 is also provided with a vertical bore 25c extending upwardly through its lower end and communicating with a horizontal bore 25d connected to a pipe 28. The bore 25c communicates with the air space of the tank 11 and the pipe 28 is an air pipe which conveys compressed air to a valve body 29.

The mixing tube 15 is provided with a laterally extending apertured arm 15b within the aperture of which the lower part of the valve body 29 is received. The valve body forms a shoulder above the arm 15b to bear against the same and below the shoulder the valve body is exteriorly screw threaded to receive a nut 30 which tightly clamps the valve body to the arm 15b. The valve body 29 is provided with a horizontal bore 29a which communicates with the air pipe 28 and leads into a central vertical cylindrical well 29b in the valve body. A vertical bore 29c projects from the lower end of the valve body into the bottom of the well 29b and the lower end of the valve body is connected to a pipe 31 which runs to and is connected with the lower end of the valve body 27. Of course, the vertical bore 29c communicates with the pipe 31 and the pipe 28 together with the valve body 29 and pipe 31 may be considered to comprise the compressed air supply line for the stove.

The well 29b communicates at its upper end with an enlarged recess 29d formed in the upper part of the valve body 29. The walls of the valve body forming the recess are provided with an internal shoulder 29e immediately above the well 29b and a disk-like diaphragm 32 rests upon the shoulder 29e to extend completely across the lower part of the recess. This diaphragm 32 is made of spring material and it seals the well 29b from the upper part of the recess 29d, an apertured nut 33 being screwed in place within the upper part of the recess to bear against the diaphragm 32.

At the point where the vertical bore 29c runs into the well 29b of the valve body, a valve seat 29f is formed against which the lower conical end of a valve member 34 may seat. This valve member has an enlarged head at its upper end which bears against the diaphragm 32 and the reduced portion of the valve member below the head forms a shoulder with the head against which the upper end of a comparatively light coiled compression spring 35 bears. This spring 35 surrounds the lower part of the valve member 34 and bears at its lower end against the bottom of the well 29b. Of course this spring normally urges the valve member 34 away from its seat 29f. Received within the aperture of the nut 33 and bearing against the upper side of the diaphragm 32 is a follower 36 having a reduced upper portion, at least, partially received within a cap 37 also fitting within the aperture of the nut 33. A relatively heavy coiled compression spring 38 received within cap 37 bears at its upper end against the top of the cap 37 and bears at its lower end against the upper end of the follower 36.

A pivot pin 39 pivotally mounted in the walls of the mixing tube 15 extends transversely across the chamber 15a below the discharge end of the generator tube. Mounted on this pivot pin 39 within the chamber 15a is a bell crank lever 40 having an upwardly extending arm 40a and a rearwardly extending arm 40b. The arm 40a is provided with an aperture 40c near its upper end within which the head of the plug 23 is received and the portion of the arm adjacent the aperture 40c is located so that the shoulder 14c of the generator tube 14 may bear against the same. The other arm 40b of the bell crank lever extends rearwardly through the air inlet opening 16 of the mixing tube and is curved somewhat laterally so that its rear end directly overlies the cap 37. A set screw 41 is mounted in the rear end of the arm 40b and the lower end of the set screw bears against the cap 37. A lock nut 42 is mounted on the set screw 41 to retain the set screw in adjusted position.

The valve body 27 is provided with a horizontal bore 27b running into a vertical bore 27c, the the horizontal bore 27b communicating with the gasoline pipe 47 and the vertical bore 27c communicating with the air pipe 31. The vertical bore 27c communicates with an upper horizontal bore 27d which communicates with the nipple 21. A needle valve 43 controls the admission of both air and gasoline from the bore 27c to the bore 27d. This needle valve extends outwardly to the front of the stove and is equipped with a handle 44.

A drain plug 45 may be provided in the bottom of the mixing valve 15 in accordance with the usual practice.

Operation

Prior to placing the stove in operation, the tank 11 will be partially filled with gasoline as to the level shown in Fig. 3, and air will be pumped into the tank 11 as by means of the pump 12 so as to place the tank under considerable air pressure. The valve 22 will be opened by turning the handle 46 to regulate the flow from the generator tube 14 into the mixing tube 15, whereupon the valve 43 will be opened by turning the handle 44 and a match or a torch will be applied over the burner 18 to light the same. Assuming that the generator tube 14 is cold, the spring 35 will hold the valve member 34 in raised position from its seat 29f and compressed air from the top of the tank 11 will be supplied through the bores 25c and 25d of fitting 25 and the pipe 28 and bore 29a to the well 29b from whence the air will travel through the bore 29c and pipe 31 to the valve body 27. At the same time, gasoline will be supplied to the valve body from near the bottom of the tank 11 through the tube 26, bores 25a and 25b of fitting 25 and pipe 47. The air running upwardly in the valve body 27 through the bore 27c will strike the gasoline issuing from the bore 27b and will break up this gasoline into small particles to vaporize most of the same. The bore 27b is made of such size relative to the bore 27c that proper quantities of both air and gasoline are admitted to the valve body for producing an instantly ignitible mixture in the burner 18. Of course, the air and gasoline will be carried through the bore 27d of the valve body 27 and nipple 21 into the forward part of the generator tube 14 to run through the generator tube and issue from the orifice of the plug 23 into the mixing tube 15. A certain amount of air will run into the mixing tube 15 through the air inlet 16 and the mixed air and gasoline will pass through the conduit 17 to the burner 18 to issue therefrom in combustible state.

As the flames from the burner 18 play upon the generator tube 14, this tube will heat and expand longitudinally, the tube being formed of a metal such as iron or steel having quite a high coefficient of expansion. When the generator tube 14 is heated sufficiently, the gasoline admitted thereto will be completely volatilized whereupon, of course, it will be desirable to cut off the supply of air to the generator tube in order to conserve the supply of compressed air within the tank 11. This is done automatically without changing the setting of either valve 22, or valve 43 when the generator tube reaches the proper temperature. As the generator tube 14 expands in length through heat, the shoulder 14c of the generator tube strikes the arm 40a of bell crank lever 40 and swings the bell crank lever to depress the arm 40b. The set screw 41 mounted in the arm 40b will depress the cap 37 to compress the spring 38 and move the follower 36 downwardly. As this is done the diaphragm 32 will bulge downwardly at its central portion to move the valve member 34 into seating relation with the valve seat 29f against the pressure of the spring 35. The valve member 34, accordingly, will automatically close off the passage of air through the bore 29c when the generator tube 14 has been heated to the proper temperature for vaporizing gasoline running therethrough. When this occurs, of course, no further air will be supplied to the generator tube and the stove will operate on gasoline alone. If the generator tube 14 should expand in length beyond the point necessary to seat the valve member 34 against the valve seat 29f, additional movement imparted to the bell crank lever 40 will be absorbed by the heavy spring 38 without injury to any of the parts. The use of the diaphragm 32, of course, prevents the possibility of leakage of air through the recess in the upper part of the valve body 29.

If, for any reason, the flame from the burner 18 should fail when the stove is in operation and unattended, the generator tube 14 will cool within a comparatively short period of time and eventually contract in length to permit the spring 35 to raise the valve member 34 from its seat 29f. Air will then again pass to the generator tube 14 and will continue to discharge through the burner 18 until all the air in the tank 11 has exhausted. When this occurs, there will no longer be a motivating force to carry the gasoline from the tank into the generator tube and no further gasoline will be carried to the tube. The thermostatically operated valve, accordingly, acts as a safety appliance for cutting off the supply of fuel to the burner within a reasonable length of time if the flame should fail.

With the present construction, the air supply to the generator tube is bound to cut off at just the proper time after the stove has been started, so that the gasoline supplied to the tube will generate into gaseous form. No matter whether the stove is operated carelessly or by inexperienced persons, the stove is bound to function properly. Also there is less likelihood of the formation of carbon in the generator tube than in devices of the prior art because of incomplete generation of the gasoline as in the generator tube.

The set screw 41 is adjusted in the arm 40b of the bell crank lever so that the valve member 34 will close on its seat 29f when the generator tube has been heated to the proper temperature so that proper combustion of the gases generated in the tube will take place in the burner without necessitating the supply of air from the tank.

Referring now to the embodiment of the invention illustrated in Figs. 9 to 15, there is illustrated a stove A generally of similar construction to the stove first described. As most of the parts of this stove are exactly similar to the parts of the stove illustrated and described in connection with the first embodiment of the invention, it is only necessary to refer to a few of the parts by different numerals. These parts include the tank 48, mixing tube 49, conduit 50 and T-shaped arm 51 preferably integrally connected to the conduit 50. The arm 51 has a horizontal portion 51a connected to the conduit 50 and running forwardly therefrom and it has a vertical portion 51b projecting upwardly from the horizontal portion and bifurcated at its upper end to embrace the generator tube 14. One of the furcations carries a screw 52 which engages the generator tube and the other furcation carries a nipple 53 having a truncated conical portion received within an opening near the forward end of the generator tube 14. The arm 51 also includes a portion 51c which projects downwardly below the horizontal portion 51a. This arm 51 is preferably formed of cast iron or steel and a horizontal rod 54 formed preferably of brass, or of some material having a considerably higher coefficient of expansion than the material forming the arm 51 extends between the forward end of the conduit 50 and the downwardly projecting portion 51c of the arm. This rod preferably has bearing at its rear end in a shallow recess 50a formed at the forward end of the conduit 50, as best shown in Fig. 10, and it has bearing at its other end directly against the downwardly extending portion 51c to which it is secured as by means of a screw 55, best shown in Fig. 13.

The mixing tube 49 is provided with an upper chamber 49a similar to the chamber 15a in the mixing tube 15 previously described, and a pivot pin 56 extends transversely across the chamber 49a and is pivotally mounted in the walls of the mixing tube. Mounted on the pivot pin 56 is a lever 57 having an upwardly extending arm apertured to receive the plug 23 at the forward end of the generating tube 14 and to allow the shoulder 14c of the generating tube to bear against this arm. Lever 57 also has a downwardly extending arm which projects through the air receiving opening 49b of mixing valve 49 and projects somewhat laterally to a point alongside the conduit 50. A rod 58 formed of brass or other material having a higher coefficient of expansion than the material forming the lever 57, bears at one end against this lever and is received within a small recess therein and it bears at its other end against a cap 59 very similar in construction to the cap 37 of the previously described embodiment with the exception that the cap 59 is recessed to receive the end of the rod 58. A valve body 60 of generally similar construction to the valve body 29 previously described, is provided. The valve body 60 instead of being vertically disposed, is horizontally disposed and the valve body 60 carries at its forward end a pin-like projection 61 which is received within a recess formed in a screw 62 mounted in and having screw threaded engagement with the downwardly projecting portion 51c of the arm 51. This screw 62 may be adjusted inwardly and outwardly relative to the portion 51c and in order to hold the screw under tension in its adjusted position, the head of the screw is provided with longitudinal peripheral grooves and a spring pressed dog 63 bears against the head of this screw. The spring of this dog is anchored at one end to the portion 51b of arm 51, as best shown in Fig. 13. The valve body 60 has a laterally projecting nipple 60a provided with a horizontal bore 60b which leads into a central horizontal well 60c in the valve body. This well at its forward end communicates with a horizontal passage 60d which at the point where it joins the well forms a valve seat 60e. The passage 60d communicates with a vertical bore 60f formed in a vertical nipple 60g which projects downwardly from the valve body. The well 60c communicates at its rear end with an enlarged recess 60h formed in the valve body and the walls of the valve body forming the recess are provided with an internal shoulder 60i immediately rearwardly of the well 60c and a disk-like diaphragm 64 rests upon the shoulder 60i to extend completely across the forward part of the recess. This diaphragm 64 is made of spring material and it seals the well 60c from the rear part of the recess 60h. An apertured nut 65 is screwed in place within the rear part of the recess 60h to bear against the diaphragm 64. A valve member 66 having a conical forward end fits within the well 60c and this valve member has an enlarged head which bears against the forward side of the diaphragm 64. This valve member cooperates with the valve seat 60e. A coiled spring 67 encircles the valve member 66 within the well 60c and this coiled spring bears at one end against the forward end of the well and at its other end against the head of the valve member. Received within the aperture of the nut 65 and bearing against the rear side of the diaphragm 64 is a follower 68 having a reduced rear portion at least partly received within the cap 59. A coiled spring 69 of considerably heavier weight than the spring 67 bears at one end against the rear end of the follower 68 and at its other end against the cap 59.

A fitting 70 is mounted in the upper part of the tank 48 and communicates with the air space thereof and connected to this fitting is a conduit 71 which runs to and is connected with the nipple 60a of the valve body 60. Another conduit 72 is connected to the nipple 60g of the valve body and this conduit in turn is connected to a fitting 73 mounted in the upper part of the tank 48. Fitting 73 is provided with a passage 73a which communicates with the conduit 72 and with a tube 74 mounted in the fitting at its upper end and projecting downwardly into the tank 48 to a point near the bottom of the tank. Attached to the lower end of the tube 74 is a cylindrical member 75 having a vertical passage 75a communicating with the lower end of the tube 74, a horizontal passage 75b communicating with the passage 75a and a vertical passage 75c communicating with the horizontal passage 75b. The outer end of the passage 75b will be closed as by means of a plug 76. The passage 75c is considerably larger than the passages 75a and 75b and the lower end of the passage 75c is closed by a plug 77 having a small orifice therein, this plug preferably having screw-threaded engagement with the member 75. An apertured nut 78 equipped with an internal shoulder near its lower end supporting a strainer 79 is secured to the lower end of the member 75, so that the strainer is disposed below the plug 77. A tube 80 of considerably larger size than the tube 74 is connected at its lower end to the member 75 in such manner as to communicate with the vertical passage 75c and this tube is coaxial with the orifice in the plug 77. The upper end of the tube 80 is mounted in the fitting 73 and communicates with a vertical passage 73b formed in this fitting. This passage 73b is enlarged some little distance above the lower end of the fitting 73 to form a chamber 73c which communicates with a passage 73d in the fitting. A rod 81 equipped with a handle 82 exterior of the fitting 73, projects into the fitting 73 through the chamber 73c and passage 73b, and extends through the tube 80, and this rod at its lower end is provided with a needle 81c which extends through the orifice of the plug 77. The rod has a screw-threaded portion 81a engaging a screw-threaded portion of the fitting 73 above the chamber 73c and below the screw-threaded portion the rod is somewhat reduced to form a valve member 81b adapted for cooperative engagement with a valve seat 73e formed in the fitting 73 at the point where the passage 73b enlarges into the chamber 73c. A suitable packing gland 83 attached to the upper end of the fitting 73 packs the rod 81. Connected to the fitting 73 and communicating with the passage 73d thereof is a conduit 84, which runs to and is connected with the nipple 53 communicating with the generator tube 14.

When it is desired to operate the stove, after the tank 48 has been partly filled with gasoline and pumped up under air pressure, the valve 22 of the generator tube 14 will be opened by turning the handle 46 to regulate the flow from the generator tube into the mixing tube 49. The valve member 81b will then be raised from its seat 73e by turning the handle 82, whereupon a match or torch may be applied over the burner 18 to light the same. Assuming that the generator tube 14 is cold, the spring 67 will hold the valve member 66 raised from its seat 60e and compressed air from the top of the tank 48 will pass through the fitting 70, conduit 71, bore 60b, chamber 60c, bore 60d, bore 60f, conduit 72, passage 73a, tube 74, passage 75a, passage 75b into passage 75c. At the same time, gasoline from the bottom of the tank 48 running up through the strainer 79 will pass upwardly into the passage 75c through the orifice in the plug 77. The air and gasoline admitted to the passage 75c will intimately mix and will pass upwardly through the tube 80 and passage 73b into the chamber 73c, whereupon it will travel through the passage 73d, conduit 84 and nipple 53 into the generator tube 14. The intimately mixed air and gasoline will pass through the generator tube into the mixing tube 49 where it will mix with additional air drawn into the mixing tube through the air opening 49b and thence be carried through conduit 50 to the burner 18. A combustible mixture is formed in the burner which will instantly ignite as a match or torch is applied over the burner.

As the flame from the burner 18 plays directly onto the generator tube 14, this tube will quickly heat up and expand longitudinally. Of course, as the generator tube heats up, any gasoline admitted thereto will volatilize so that shortly after the burner is set in operation, all the fuel passing through the generator tube and to the burner 18 will be in volatile state. As the generator tube 14 heats and expands, the shoulder 14c of the tube striking the upper arm of the lever 57 will swing this lever to carry the lower arm of the lever forwardly and move the rod 58 forwardly. This rod bearing against the cap 59 compresses the spring 69 to move the follower 69 and diaphraghm 64 forwardly thereby urging the valve member 66 against the pressure of the light spring 67 into engagement with its seat 60e. The device is so adjusted by moving the recessed screw 62 inwardly or outwardly in the downwardly extending portion 51c of arm 51 that when the generator tube 14 has heated up to such a point that liquid gasoline supplied to the generator tube will completely volatilize, the generator tube has expanded in length sufficiently to cause the valve member 66 to engage its seat 60e. As this is done, the air supply from the tank 48 is cut off and then only gasoline in liquid state will be supplied through the conduit 84 to the generator tube.

After the burner 18 has been in operation for some time, the arm 51, conduit 50, mixing valve 49 and lever 57 will heat up and expand to some extent. Naturally this expansion of these parts, unless compensated for, will tend to lengthen the spacing between the point of engagement of the arm 51 with the generator tube and the point of engagement of the shoulder 14c of the tube with the lever 57 to reduce the effect caused by the expansion of the generator tube. The lower arm of the lever 57 being considerably longer than the upper arm thereof, will also expand to a greater extent in length than the upper arm and the expansion of these parts 51, 49, 50 and 57 will naturally tend to relieve the pressure of the rod 58 against the cap 59, so that it would be the tendency of the rod 58 to move rearwardly thereby allowing spring 67 to force the valve member 66 away from its seat 60e and allow small quantities of air from the tank to pass to the generator tube. This would soon exhaust the compressed air from the tank 48 unless compensation were made for the expansion through heat of the said parts. This compensation is made chiefly through use of the rod 54 and to some extent also by use of the rod 58. Both rods are composed of brass or of some other metal having a relatively higher coefficient of expansion than the parts 51, 49, 50 and 57. As the parts 51, 49, 50 and 57 heat up and expand, the two rods 58 and 54 will similarly heat up and expand. The rod 54 as it heats and expands, must increase the spacing between the forward end of the conduit 50 and the downwardly projecting portion 51c of arm 51. As the rod 54 heats therefor, the downwardly projecting portion 51c will be forced farther away from the forward end of the conduit 50 and within the elastic limits of the arm 51 the upwardly projecting portion 51b and the downwardly projecting portion 51c will swing about the horizontal portion 51a as a fulcrum. The portion 51b will swing rearwardly to carry the generator tube 14 rearwardly and due to its long lever arm, it will thereby more than compensate for any loss occasioned by the expansion of the horizontal portion 51a of the arm 51 and of the mixing tube 49 and conduit 50 through the heating of these parts. The rod 58 due to the high coefficient of expansion of the material forming the same will more than compensate for the expansion of the lower arm of the lever 57 as the rod 58 and lever heat and expand. While it is not absolutely essential that the rod 58 be constructed of metal having a high coefficient of expansion inasmuch as the expansive action of rod 54 may be sufficient to compensate fully for the expansion of all the parts 51, 49, 50 and 57, it is desirable to also secure some compensating action from rod 58 by constructing this rod of brass or other material highly expansible when heated. The valve member 66 is thus maintained in engagement with its seat 60e to prevent the flow of air to the generator tube after the burner has been in operation for some time and the parts supporting the burner and generator tube have become heated up.

By provision of the needle 81c connected to the rod 81, the orifice in the plug 77 will be cleared through reciprocation of the needle each time that the valve formed by the fitting 73 and the valve member 81a is opened or closed. Also with the construction shown, the orifice in the plug 77 can be accurately calibrated relative to the size of the air passages 75a and 75b leading into the passage 75c so that the proper mixture to support combustion can be made between the air and the gasoline for initially supplying the generator tube 14.

The fuel feeding system illustrated in Figs. 9 to 15 is a refinement of the fuel feeding system illustrated in Figs. 1 to 8. Both systems automatically cut off the supply of air to the generator tube after the generator tube has been heated to the proper temperature for generation of the liquid fuel into gas to properly support combustion.

Although the invention is illustrated in connection with gasoline pressure stoves, it will be understood that it may be utilized in connection with lanterns, heaters of all types and burners of all types wherein any liquid hydrocarbon fuel is utilized.

The device of the invention is simple in construction and in operation. It has been successfully demonstrated in actual practice.

It will, of course, be understood that various changes may be made in the form, details, arrangement and proportions of the various parts without departing from the scope of the present invention, which, generally stated, consists in the matter shown and described and set forth in the appended claims.

What is claimed is:—

1. A fuel feeding system for hydrocarbon burners having in combination a generator heated by the burner when in operation, a fuel tank adapted to contain liquid fuel under air pressure and having a compressed air space and a liquid fuel space, a valve body mounted in said tank, a tube running into the liquid fuel space of said tank and connected to said valve body, an orificed plug closing the lower end of said tube, an air conduit running from the air space of said tank into said tube, a valve controlling the supply of air through said air conduit, thermostatically operated means for closing said valve after said generator has been heated to a certain temperature, a rod projecting through said valve body and tube, said rod having a needle extending into the orifice of said plug, said rod forming a valve member controlling the passage of fluid through said tube and a conduit controlled by said valve member and extending from said body to said generator.

2. A fuel feeding system for hydrocarbon burners having in combination a generator tube heated by the burner when in operation, a liquid fuel supply means for feeding said tube, a compressed air supply means for simultaneously feeding air with liquid fuel to said tube, means affording communication between said two supply means and said tube, a valve in said compressed air supply means controlling the passage of air therethrough, a supporting structure for said generator tube and said valve and subject to some expansion through heat from said burner when in operation, said supporting structure being connected to said generator tube in spaced relation from one end thereof, a member bearing against the said end of said generator tube and movable by said tube as the tube expands through heat and a rod formed of material having a higher coefficient of expansion than the material forming said supporting structure and extending between said member and said valve, said valve being normally open and said rod acting to close said valve as said generator tube is heated to a certain temperature and the expansion of said rod through heat acting to compensate to at least some degree for the expansion of said supporting structure as it is heated.

3. The structure defined in claim 2, and means additionally compensating for the expansion through heat of said supporting structure.

4. A fuel feeding system for hydrocarbon burners having in combination, a generator tube heated by the burner when in operation, liquid fuel supply means, compressed air supply means, means affording communication between said two first mentioned means and said tube, means operated by the expansion of said tube as it is heated for closing off said air supply means when the tube has been heated to a certain temperature, supporting means for said tube and said fourth mentioned means, said supporting means being subject to the heat of said burner and compensating means preventing the expansion by heat of said supporting means from interfering with the action of said fourth mentioned means.

5. A fuel feeding system for hydrocarbon burners having in combination, a generator tube heated by the burner when in operation, liquid fuel supply means for feeding said generator tube, compressed air supply means for feeding said tube, means affording communication between said two first mentioned means and said tube, means controlled by the expansion of said generator tube as it is heated for closing off said air supply means after said tube has been heated to a certain temperature, supporting means for said tube and heat expansive means preventing the expansion by heat of said supporting means from interfering with the action of said fourth mentioned means.

6. A fuel feeding system for hydrocarbon burners having in combination, a generator tube heated by the burner when in operation, a liquid fuel supply means for feeding said generator tube, a compressed air supply means for feeding said tube, means affording communication between said two first mentioned means and said tube, means bearing against one end of said generator tube and operating as said tube expands through heat to close off said air supply means after said tube is heated to a certain temperature, supporting means for said fourth mentioned means and the other end of said tube, said supporting means being subject to the heat of said burner and compensating means preventing said supporting means from retracting the first mentioned end of said tube from said fourth mentioned means as said supporting means expands through heat.

7. A fuel feeding system for hydrocarbon burners having in combination, a generator tube heated by the burner when in operation, a liquid fuel supply means, a compressed air supply means, means affording communication between said two first mentioned means and said tube, a valve controlling the flow from said compressed air supply means, fixed supporting means for said tube having a portion supporting the same, in spaced relation from one end of the tube, said supporting means being subject to the heat of said burner, operating means for said valve bearing against said end of said generator tube and closing said valve when said tube has expanded in length from said portion of said supporting means through heat imparted therethrough by said burner, and heat expansive means subject to the heat of said burner preventing said portion of said fixed supporting means from moving farther away from said end of said tube by the expansion through heat of said supporting means.

8. A fuel feeding system for hydrocarbon burners having in combination, a generator tube heated by the burner when in operation, liquid fuel supply means, compressed air supply means, means affording communication between said first two mentioned means and said tube, a valve controlling the flow through said compressed air supply means and normally resiliently urged to open position, a supporting structure for said valve and tube, said supporting structure including a portion adjacent said burner disposed longitudinally of said tube, a portion joining said longitudinally extending portion and connected to said tube in spaced relation from one end thereof, operating mechanism for said valve including a member bearing against said end of said tube and movable to close said valve as said tube expands through heat imparted thereto by said burner and means preventing the last mentioned portion of said supporting structure from moving farther away from said member as the first mentioned portion of said supporting structure expands through heat imparted thereto.

9. A fuel feeding system for hydrocarbon burners having in combination, a generator tube, a burner disposed adjacent the generator tube to play thereon, a fixed supporting structure for the burner and generator tube, said supporting structure including a mixing tube supporting for longitudinal movement the rear portion of said generator tube, said supporting structure also including a conduit joining said mixing tube and running forwardly therefrom, below said burner, said conduit supporting said burner and supplying fuel thereto, said supporting structure further including a T-shaped arm connected to said conduit at its rear end and having a leg extending longitudinally of said generator tube, said arm also having an upwardly extending leg projecting from the forward end of said longitudinally extending leg and secured to said generator tube forward of the rear portion of said generator tube and said arm further having a downwardly extending leg projecting from the forward end of said longitudinally extending leg, a member formed of a material having a higher coefficient of expansion than the material forming said supporting structure and bearing at one end against the forward end of said conduit and bearing at its other end against said downwardly projecting leg, liquid fuel supply means, compressed air supply means, means affording communication between said two supply means and said generator tube, a valve controlling flow through said compressed air supply means, said valve being supported from said supporting structure and said valve being normally urged to open position and an operating connection supported by said supporting structure having bearing against the forward portion of said generator tube and controlling the opening and closing movement of said valve.

HANS C. HANSON.
WALTER OLSEN.